United States Patent Office 3,148,148
Patented Sept. 8, 1964

3,148,148
METHOD OF COMBINING CERAMIC-FORMING PARTICLES WITH A WAX
Edward J. Motyl, Downers Grove, Ill., assignor to Western Electric Company, Incorporated, New York, N.Y., a corporation of New York
No Drawing. Filed July 6, 1961, Ser. No. 122,076
5 Claims. (Cl. 252—62.5)

The present invention relates generally to methods of combining ceramic-forming particles with a wax, and more particularly to the preparation of molding compositions featuring a unique process of incorporating the necessary waxes, or wax-like ingredients, which are conventionally used as binders, lubricants, or lubricant-binder combinations to permit forming the desired shapes under pressure. Accordingly, the general objects of the invention are to provide new and improved methods of such character.

The invention is especially useful in the manufacture of ceramic-type, magnetic ferrites of substantially every type; for example, the specific type of manganese-zinc ferrite disclosed in G. J. Maxson Patent 2,956,024, which issued on October 11, 1960, to the assignee of the present application. According to the Maxson patent, and as is common practice in the ferrite art, a mixture of ferrite-forming oxide particles are bound together with Halowax, a chlorinated naphthalene wax-like substance which serves both as a binder and as a lubricant. The Halowax-bound particles are then molded under high pressure into a desired shape, which is then fired in at least two stages: (1) to volatilize the Halowax binder, and (2) to sinter the oxide particles together into the final ceramic ferrite article. According to the prior process, for example as disclosed in the Maxson patent, the Halowax was blended with the oxide particles by grinding the oxide particles in a carbon-tetrachloride solution of Halowax, with the carbon tetrachloride being later removed by fractional distillation leaving the oxide particles coated with Halowax.

Further objects of the invention are to provide improved methods of blending Halowax or analogous waxes or wax-like ingredients with ferrite-forming particles to form improved molding compositions having properties superior to those obtained by blending in the manner previously utilized and which are more readily molded.

Other specific objects of the invention are to provide a combined composite mixture of ferrite-forming particles and Halowax or similar material having (1) an enhanced green strength; (2) no aging requirement; (3) improved flow properties; (4) no hygroscopic tendencies, by which is meant atmospheric water pickup which was a serious problem with the former method; and (5) no need for solvents or other extrinsic contaminants which are sometimes difficult to drive off completely and which tend to deteriorate the molding properties.

With the foregoing and other objects in view, a method of binding ceramic-forming particles together with a wax-like ingredient, illustrating certain aspects of the invention, may include the step of forming a slurry of the particles in a liquid medium at a temperature above the melting point of the wax-like ingredient. The liquid medium must be one that does not dissolve the particles and is immiscible with the wax-like ingredient. The wax-like ingredient is introduced in liquid form into the slurry while the slurry is agitated sufficiently to disperse globules of the wax-like ingredient in the slurry, the wax-like ingredient forming, and being one which is capable of forming, a protective layer of the particles about the dispersed wax globules. Thereafter, the mixture is cooled to solidify the wax while continuing the agitation, and then the combined wax-particle solids formed are recovered.

Preferably, the particles are ferrite-forming oxide, hydroxide, or carbonate particles, the liquid medium is water at the boiling point, and the wax-like ingredient is a chlorinated naphthalene wax having a melting point below the boiling point of water.

A molding composition, constituting a specific embodiment of the invention, comprises a combined composite mixture of ferrite-forming particles and chlorinated naphthalene wax formed in accordance with the preferred process described previously. Such a composition is highly useful in the manufacture of ferrites as it possesses, among other improved properties, high green strength, no aging requirement, better flow properties, no hygroscopic tendencies, and requires the use of no solvents or other extrinsic contaminants, the presence of which may degrade the high green strength and high-pressure flow properties.

Other objects, advantages and aspects of the invention will be apparent from the following detailed description of a specific example thereof, when taken in conjunction with the accompanying description relative to permissible variations in the process conditions.

Example

The Maxson patent describes a typical process of making manganese-zinc ferrites of one particular type used in the telephone industry. In one specific process, a mixture of raw materials is compounded consisting of 24.74 pounds of ferric oxide, 5.76 pounds of zinc oxide, and 9.50 pounds of manganese carbonate. These raw materials are wet-mixed, filtered, dried, ground, and are then calcined at approximately 1750° F. The next step in the process is to bind these particles together with a Halowax binder prior to the compression and firing operations. The specific "Halowax" used in the process is designated "HW–1001," and is a water-immiscible, chlorinated naphthalene wax-like ingredient, which melts below 212° F. and over a range centering at about 195° F. This compound is manufactured by the Halowax Chlorinated Naphthalene Koppers Co., Inc., Tar Products Division, Pittsburgh, Pa.

According to one specific example of the present invention, 1000 grams of the calcined mixture of oxide particles is mixed with 2 liters of distilled water by milling in a steel ball mill for 16 hours to provide an aqueous slurry containing approximately 33% by weight of microscopic solids, having an average particle size of the order of 1 micron. This slurry is thoroughly agitated and is heated to 212° F., the boiling point of water at atmospheric pressure.

After this has been done, 150 grams of molten Halowax (type HW–1001), 15% by weight based on 100% of particles in the slurry, at a temperature of approximately 220° F. is poured slowly into the hot slurry, and agitation is continued for about 10 minutes with the temperature being maintained at the boiling point. After this, the mixture is cooled to 140° F. with continued agitaion to solidify the wax, after which the mixture is allowed to cool down to room temperature and further agitation is unnecessary.

When the foregoing steps are followed, the wax becomes thoroughly combined with the oxide particles, to form the combined composite particles of the invention. These combined wax-particle solids are then removed from the water, as by filtering, and then the filter cake is dried, granulated and otherwise prepared for use as a molding composition.

When the wax is first poured into the slurry, the wax becomes dispersed into relatively large globules which travel through the turbulent slurry and become surface coated with the microscopic particles so as to form wax-particle agglomerates featuring a protective layer of the particles on the globules that prevents coalescence of the globules into larger units. Thus, the particles themselves act as a dispersing agent by insulating the surfaces of the globules from each other and preventing coalescence.

Due to the turbulence of the agitated slurry, the relatively large globules initially formed continuously break up into smaller globules which immediately become coated with the particles to prevent recombination. When a dispersion of the wax in water, without the microscopic particles, is so agitated, the globule break-up still occurs, but recombination or coalescence takes place on a continuous basis and a dynamic equilibrium is set up. However, when carrying out the present invention, the particles destroy that equilibrium by susbtantially preventing the recombination, and only the breaking-up action proceeds. After a sufficient time, 10 minutes in the specific example, the coating and break-up operations have proceeded to the degree where the wax and particles are thoroughly intermingled into the combined wax-particle solids, which upon cooling have a particle size distinctly smaller than 325 mesh.

Although the foregoing description is believed to represent an accurate explanation of the theory by which the subject process operates to form an advantageous combined mixture of ceramic-forming particles and wax, it should be understood that the invention is directed to the steps employed and the product formed and not to any particular explanation of the manner in which the process operates.

The preferred ranges of specific process conditions for blending Halowax with ferrite-forming oxide particles are set out below in tabular form.

| Item: | Range |
|---|---|
| Average particle size | 0.1 to 10 microns. |
| Percent by weight particles in water slurry | 20 to 45%. |
| Percent by weight wax based on 100% by weight of particles in the slurry | 5–20%. |
| Time of blending | 1–20 minutes, depending on amounts of ingredients, and the mixing equipment. |

The molding composition formed in accordance with the foregoing specific example of the process, consisting of a combined mixture of the ferrite-forming oxide particles and Halowax, required no aging and may be compressed immediately with conventional equipment into articles of a desired shape, such as core rings, cups, etc. at pressures up to about 100,000 pounds per square inch.

The articles are then heat treated in a controlled atmosphere according to a carefully regulated heating and cooling schedule according to the needs of the particular ferrite, a preferred schedule for manganese-zinc ferrites being described in the Maxson patent. Briefly, the heat-treating process includes a dewaxing stage wherein the articles are heated to a temperature of about 900° F. to volatilize and drive off the Halowax binder, a sintering stage wherein the articles are further heated to a maximum temperature of about 250° F., as required by the individual ferrite used, and a cooling stage wherein the articles are cooled under controlled conditions to provide optimum magnetic properties.

It is not fully understood in precisely what specific physical or chemical manners the molding compositions produced in accordance with the present invention differ from those produced in accordance with the solvent-application process mentioned hereinbefore and described in the Maxson patent; however, it has been demonstrated that the properties of those molding compositions formed in accordance with the present invention are superior in many respects.

A first important difference is that the present compositions have a higher green strength, by which is meant the physical strength of the pressed article after compression and before dewaxing, so that there is less breakage in handling, etc., and fewer defective articles.

A second important difference is the lack of aging requirements mentioned hereinbefore.

A third important difference is that the subject compositions have improved flow properties under the relatively high pressures employed in the molding operations, circa 50,000 pounds per square inch and up to about 100,000 pounds per square inch. The improved flow characteristics permit the manufacture of a more uniform molded part, which has great strength, uniform density, and, a minimum of layering and segregation.

A fourth importnat difference resides in the absence of hygroscopic tendencies, whereby layering in the compressed article is avoided and a more homogenous product is produced.

Further, the need for solvents or other extrinsic contaminants has been eliminated by entirely, and no toxic or otherwise harmful additives are required.

While one specific embodiment of the invention has been described in detail hereinabove, it will be obvious that various modifications may be made from the specific details described without departing from the spirit and scope of the invention.

Specifically, while the process was especially designed to blend Halowax with ferrite-forming oxide particles to form a molding compound, one of the many types of which is discussed in detail, other water-insoluble ceramic-forming particles may be similarly blended with Halowax or other wax or wax-like ingredients meeting the required process conditions. Since the method of the invention relates solely to the purely physical process of combining ceramic-forming particles of any type with a wax-like ingredient (that is, since there is no chemical action between the ceramic-forming particles and the wax-like ingredient), further specific examples of the process are deemed unnecessary; the physical blending process is carried out in precisely the same manner as is described in conjunction with the specific example no matter which specific ceramic-forming constitutents are selected out of the many thousands of formulae which are known in the art. As is well known, ceramic-forming particles are selected from several different-valent metallic oxides, hydroxides, carbonates and the like. Also, although water is the preferred suspending medium, other liquids could be used which (1) do not dissolve or otherwise affect the particles, (2) are immiscible with the wax, and (3) remain liquid at a temperature above the melting point of the wax.

What is claimed is:

1. The method of combining ceramic-forming particles with a wax, which comprises the steps of:
    (A) forming a slurry of the particles in a liquid medium at a temperature above the melting point of the wax, the liquid medium being one that does not dissolve the particles and is immiscible with the wax;
    (B) introducing the wax, in liquid form, into the slurry while agitating the slurry sufficiently to disperse globules of the wax in the slurry, to cause the particles to form a protective layer about the dispersed wax globules;
    (C) cooling the mixture to solidify the wax while continuing the agitation; and then
    (D) recovering the combined wax-particle solids formed.

2. The method as recited in claim 1, wherein the liquid medium is water which is maintained at the boiling point during steps (A) and (B).

3. The method of preparing a molding composition consisting essentially of a combined mixture of microscopic ferrite-forming metallic oxide particles together with a chlorinated naphthalene wax having a melting point below the boiling point of water, which method comprises the steps of:
(A) forming a slurry of the particles in boiling water;
(B) agitating the hot slurry thoroughly;
(C) pouring a molten chlorinated naphthalene wax, having a melting point below the boiling point of water, slowly into the hot slurry while agitating the slurry sufficiently to disperse globules of the wax in the slurry, the particles forming a protective layer about the dispersed wax globules which prevents the globules from coalescing but permits break-up of the globules into smaller units;
(D) continuing the agitation of the hot slurry until the particles and wax have been thoroughly combined into small wax-particle solids;
(E) cooling the mixture with continued agitation to solidify the wax,
(F) filtering out the combined wax-particle solids formed; and then
(G) drying and granulating the filter cake to produce the molding composition.

4. The method as recited in claim 3, wherein the following process conditions are met:

| | |
|---|---|
| Average particle size _____microns__ | 0.1 to 10 |
| Percent by weight particles in water slurry percent__ | 20 to 45 |
| Percent by weight wax based on 100% by weight of particles in the slurry _____percent__ | 5-20 |

5. The method of combining ceramic-forming particles with a chlorinated naphthalene wax, which comprises the steps of:
(A) forming a slurry of particles in boiling water;
(B) introducing a chlorinated naphthalene wax having a melting point below the boiling point of water, in liquid form, into the boiling slurry while agitating the slurry sufficiently to disperse globules of the wax in the slurry, said particles forming a protective layer about the dispersed wax globules;
(C) cooling the slurry to solidify the wax while continuing the agitation; and then
(D) recovering the combined wax-particle solids formed.

References Cited in the file of this patent

UNITED STATES PATENTS

| | | |
|---|---|---|
| 1,977,698 | Scott | Oct. 23, 1934 |
| 2,723,238 | Simpkiss | Nov. 8, 1955 |
| 2,775,566 | Crowley | Dec. 25, 1956 |
| 2,956,024 | Maxson | Oct. 11, 1960 |

OTHER REFERENCES

Emulsions, Carbide and Carbon Chemicals Corp., 7th ed., April 15, 1946, pages 34–38.

UNITED STATES PATENT OFFICE
CERTIFICATE OF CORRECTION

Patent No. 3,148,148 September 8, 1964

Edward J. Motyl

It is hereby certified that error appears in the above numbered patent requiring correction and that the said Letters Patent should read as corrected below.

Column 3, line 63, for "250° F." read -- 2500° F. --; column 4, lines 62 and 63, strike out "to cause the particles to form" and insert instead -- said particles forming --.

Signed and sealed this 19th day of January 1965.

(SEAL)
Attest:

ERNEST W. SWIDER
Attesting Officer

EDWARD J. BRENNER
Commissioner of Patents